(12) United States Patent
Angione

(10) Patent No.: US 6,408,741 B1
(45) Date of Patent: Jun. 25, 2002

(54) HYDRAULIC CONTROL DEVICE FOR MOTOR VEHICLE CLUTCH

(75) Inventor: Pasquale Angione, Paris (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/673,976

(22) PCT Filed: Feb. 25, 2000

(86) PCT No.: PCT/FR00/00480
§ 371 (c)(1),
(2), (4) Date: Jan. 11, 2001

(87) PCT Pub. No.: WO00/50280
PCT Pub. Date: Aug. 31, 2000

(30) Foreign Application Priority Data

Feb. 26, 1999 (FR) .............................. 99 02428

(51) Int. Cl.[7] ................................ F16J 10/00
(52) U.S. Cl. ..................... 92/165 R; 92/170.1
(58) Field of Search ............... 92/169.1, 170.1, 92/165 R; 60/533, 568

(56) References Cited

U.S. PATENT DOCUMENTS 3,769,117 A * 10/1973 Bowen et al. ............... 156/69
5,642,654 A * 7/1997 Parekh et al. .............. 92/172 X
6,289,790 B1 * 9/2001 Rey .......................... 92/170.1

FOREIGN PATENT DOCUMENTS

| EP | 0345451 | 12/1989 |
| FR | 2741920 | 6/1997 |
| GB | 2171847 | 9/1986 |

* cited by examiner

*Primary Examiner*—John E. Ryznic
(74) *Attorney, Agent, or Firm*—Liniak, Berenato, Longacre & White

(57) ABSTRACT

A hydraulic control device for a motor vehicle clutch, comprising at least a control cylinder (10) wherein the cylinder (10) comprises a substantially tubular cylinder body (17) wherein a piston (20) slides axially defining a cylindrical hydraulic chamber (16), wherein the cylinder body (17) comprises a main body (18) and a rear tube (50) guiding the piston (22). The rear tube (50) and the main body (18) co-operate through matching cylindrical surfaces to enable the rear tube (50) and the main body (18) to be assembled by axial nesting and laser welding.

13 Claims, 4 Drawing Sheets

HYDRAULIC CONTROL DEVICE FOR MOTOR VEHICLE CLUTCH

BACKGROUND OF THE INVENTION

1. Field of the Invention

This invention relates to an improved apparatus for hydraulic control of braking or of a clutch in a motor vehicle, in which an emitter or receiver cylinder includes a rear guide tube which is telescoped axially in a main body of the cylinder.

More particularly, the invention relates to apparatus for the hydraulic control of a motor vehicle clutch, of the type comprising at least one control cylinder, wherein the cylinder comprises a substantially tubular cylinder body in which there slides axially a piston which delimits, through a front transverse face, a cylindrical hydraulic chamber, wherein a port for connection of a duct is open into the hydraulic chamber, and wherein the cylinder body is made in at least two parts of synthetic material such as plastics material, which parts comprise a main body and a rear guide tube which is mounted within a rear part of the main body, and which participates in the guiding of the piston in the cylinder.

2. Description of Related Art

A cylinder of this type is known, and was in particular described and shown in European patent application EP-A-0 345 451.

In that document, the rear tube and the main body are made of plastics material, and each of them is provided with a screw thread so as to enable the rear tube to be assembled into the main body in a screwing operation.

This type of assembly has the disadvantage that it is delicate to carry out and relatively fragile, given that the components are made of plastics material.

In addition, screwed assembly makes it necessary to provide between the rear tube and the main body a radial clearance which is large enough to enable the screwing operation to take place and to compensate for any errors in the form of the screw thread.

As a result, it is not possible to guarantee that the rear tube and the main body will be perfectly coaxial with each other, although it is necessary that they are, in order to guarantee good sliding movement of the piston in the cylinder.

With a view to providing a solution to these problems, an arrangement is described in the document FR-A-2 741 920 in which the rear tube and the main body are in cooperation through complementary cylindrical surfaces so as to enable the rear tube to be assembled in the main body by axial telescoping.

The rear tube is secured in the main body by welding or by sealed adhesive bonding.

The adhesive bonding or welding is carried out at least partly between the two complementary cylindrical surfaces of the rear tube and main body.

The rear tube carries at least one annular dynamic sealing member which is interposed between the piston and the rear tube so as to seal the hydraulic chamber.

The cylinder body is made of plastics material and the piston is made of metal.

This arrangement does give satisfaction, but in the case of a weld, it is necessary to protect the dynamic sealing member. In addition it is desirable to have components of plastics material which are of simple design.

SUMMARY OF THE INVENTION

An object of the present invention is to respond to these desires.

According to the invention, an apparatus of the type described above is characterised in that the welding of the rear tube to the main body is carried out locally by indirect application of heat with the aid of at least one energy source of the laser type.

Thanks to the invention, the dynamic sealing member is protected because the welding operation is performed locally, and with precision, by indirect application of heat using a laser beam.

In addition, by contrast with a weld of the ultrasonic type, no vibration is transmitted to the rear tube and main body, which also enables these components to be protected, as well as the dynamic sealing member.

The solution according to the invention is therefore less costly because it enables components to be made to simplified designs as compared with components which are welded together ultrasonically.

In this connection, this method of assembly allows increased freedom of design for the components because there is no need to bring a sonotrode as close as possible to the zone to be welded, as is the case with ultrasonic welding. The weld plane can be inclined. It is possible to weld the rear tube with the main body in several zones, and one of the zones can be continuous while the other is not. New forms can be envisaged, especially with a view to standardisation of the control cylinder.

Thus, in a preferred embodiment, the cylinder body is made in three parts, and includes a central part which is arranged between a blind front part and the rear tube which constitutes a guide jacket. The main body is thus in two parts, namely the front part defining the hydraulic chamber and the central part which constitutes the rear portion of the main body in which the rear guide tube is fixed. The sealing member is lodged within the central part, which preferably has fastening means such as ears for fastening to a fixed part of the vehicle.

In order to complete the weld, the telescopic engagement of the rear tube in the main body is carried out with radial gripping, for example by force-fitting.

Preferably, the radiation in the form of a beam emitted by the laser is in the infrared radiation range, so that the main body and the rear guide tube can be made of mouldable plastics material which is inexpensive, for example material based on filled or unfilled polyamide.

When the laser is located externally, the main body is in material transparent to infrared radiation, while the rear tube absorbs infrared radiation. In one embodiment, this tube is of a material different from that of the main body. In another version, the material is identical, but the rear tube contains at least one additive such as pigment, for example 1 to 2% of carbon, for absorbing the infrared radiation.

Thus the infrared beam emitted by the laser passes through the transparent component without degrading it, and superficially heats the absorbent component which contains the additives.

During this welding operation, it is possible, if desired, to turn the component with respect to the laser beam, and vice versa.

BRIEF DESCRIPTION OF THE DRAWINGS

Further features and advantages of the invention will appear on a reading of the following detailed description, for an understanding of which reference will be made to the attached drawings, in which.

DETAILED DESCRIPTION OF PREFERRED EMBODIMENTS

Figure 1:
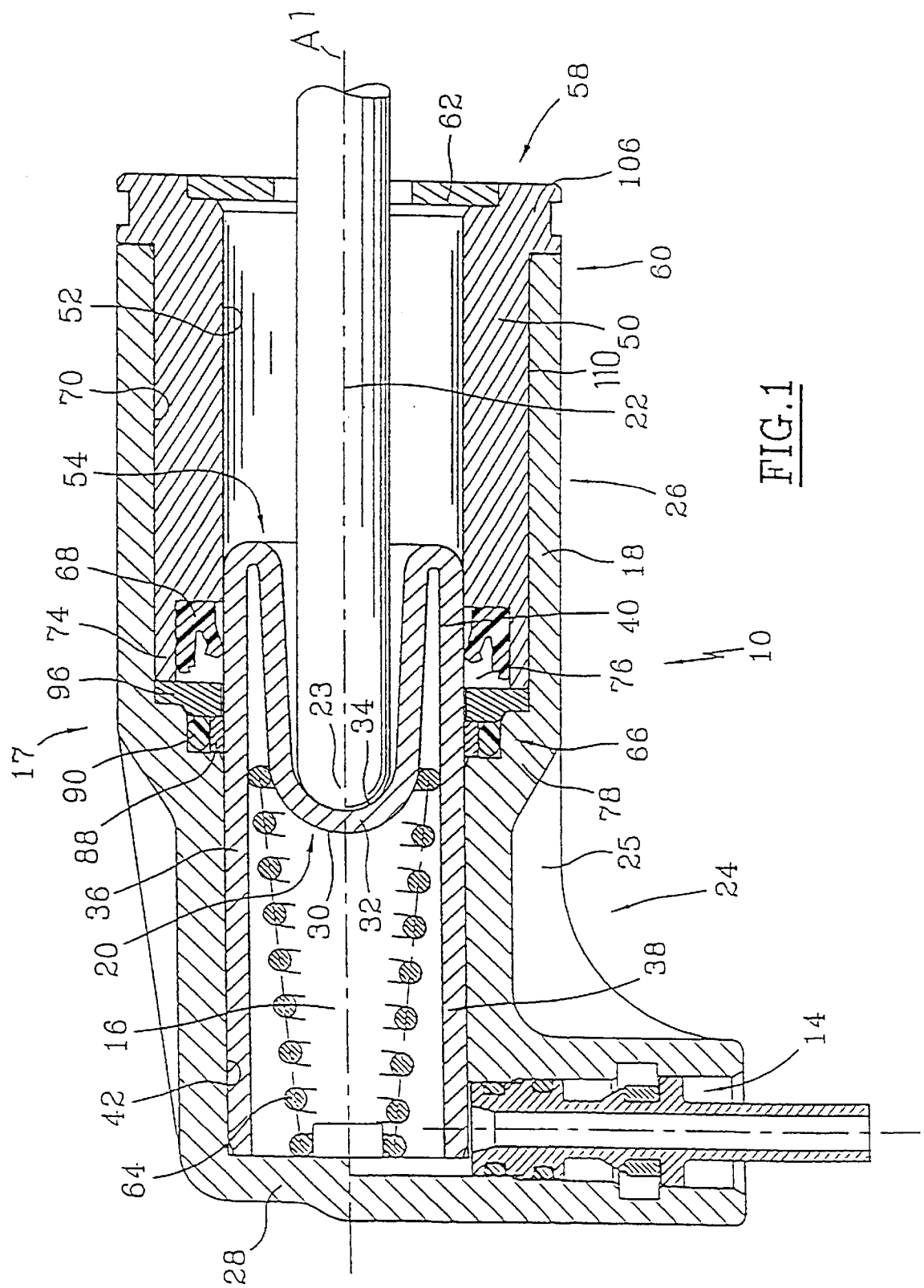
FIGS. 1 and 2 are views in axial cross section of a receiver cylinder in accordance with the features of the invention, in which the piston is shown in a first or deployed position and in a second or retracted position, respectively.
Figure 2:
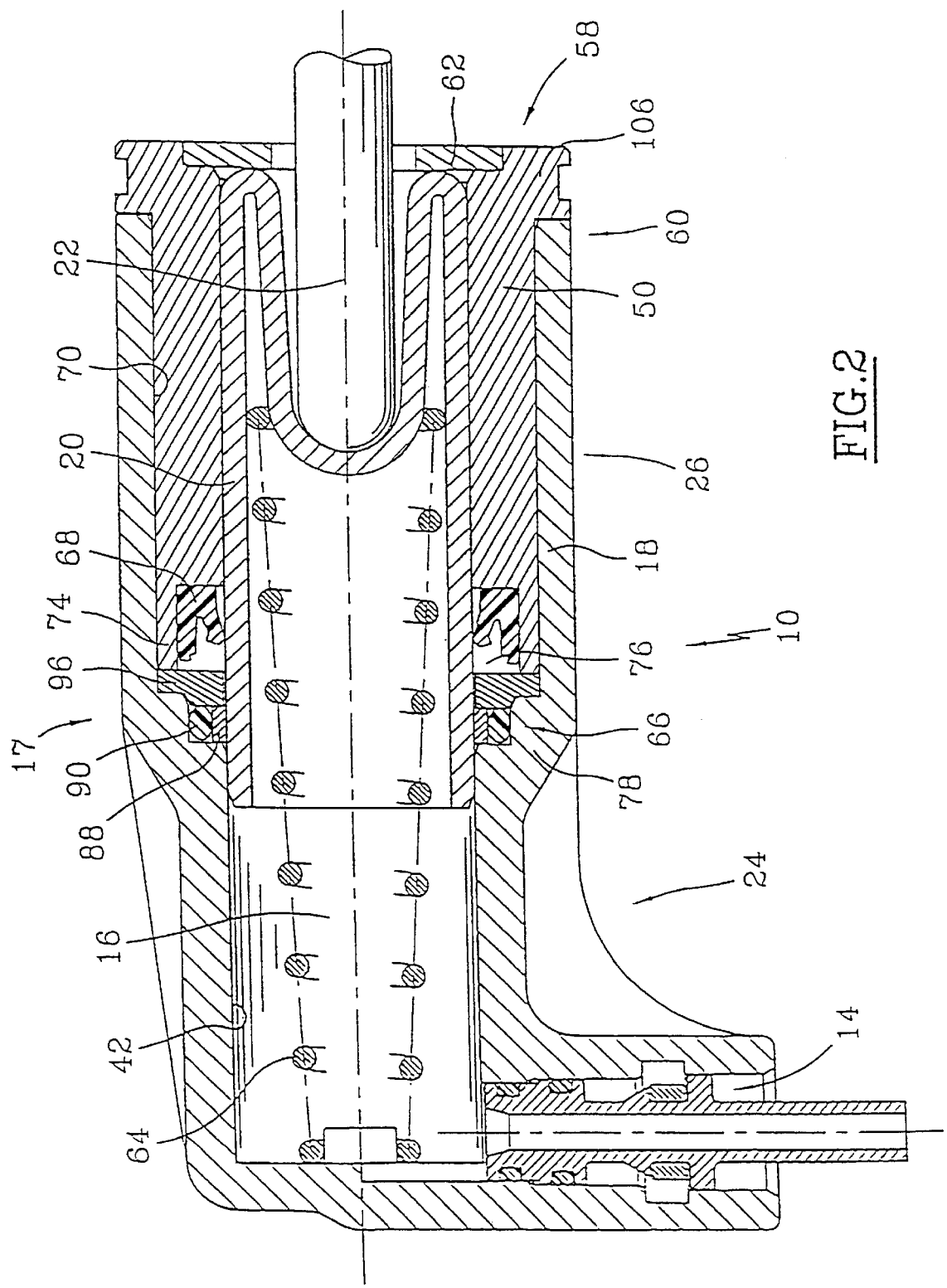

FIGS. 1 and 2 show a receiver cylinder 10 for an apparatus for the hydraulic control of a motor vehicle clutch.

Such an apparatus (not shown) consists essentially of an emitter cylinder having a structure similar to the receiver cylinder shown here, and in which a piston is displaced under the action of a control rod which is coupled, for example, to a clutch pedal operated by the driver. The piston of the emitter cylinder is arranged to expel a fluid such as an oil contained in a hydraulic chamber, into a duct 12 which connects the emitter cylinder to the receiver cylinder 10.

The duct 12 is open through an inlet port 14 to the interior of a variable volume hydraulic chamber 16, which is defined within a cylinder body 17 of synthetic material, for example plastics material, of the receiver cylinder 10, so as to cause displacement of a piston 20 which, through a control rod 22, acts for example on a control fork for a clutch (not shown), thereby disengaging the clutch. In another version, the piston acts on the fork in traction through a cable or any other means.

The cylinder body 17 comprises a main body 18 of plastics material which is in the form of a stepped tube having an axis Al, and which includes a front portion 24 the diameter of which is less than that of a rear portion 26. The internal diameter of the front portion 24 is therefore smaller than the internal diameter of the rear portion 26.

In order to stiffen the cylinder body 17, stiffening ribs 25 are provided around the front portion 24 of the main body 18. The body 18 is closed at the front and open at the rear.

More precisely, the hydraulic chamber 16 is defined within the front portion 24 of the cylinder body 17, and it is bounded axially at the front by a transverse front wall 28 in which the inlet port 14 is formed, and at the rear by a front transverse face 30 of the piston 20.

It can be arranged that the hydraulic chamber is provided with axial grooves (not shown) which are for example formed integrally by moulding with the main body 18, and which are disposed circumferentially in corresponding relationship with the stiffening ribs 25. The grooves permit, in particular, better distribution to be obtained in the contact pressure between the piston 20 and the main body 18, and they also enable any thickening of the material to be avoided in the main body 18 in the region of the ribs 25, which is of particular importance in a component made by moulding.

In addition, the inlet port 14 is open radially into the hydraulic chamber 16, which enables the axial size of the receiver cylinder 10 to be reduced.

The volume of the hydraulic chamber 16 is arranged to vary as a function of the position of the piston 20 in the cylinder body 17, the piston 20 being arranged to slide axially between a first or deployed position shown in FIG. 1 and a second or retracted position shown in FIG. 2.

The piston 20 which is shown in these Figures is made by press-forming a metal plate, for example of steel or aluminium alloy, though other methods of manufacture, such as forging or casting, may be envisaged.

The piston 20 consists essentially of a transverse wall 32, the front face 30 of which delimits the hydraulic chamber 16, with its rear face 34 being in cooperation with the control rod 22, together with a cylindrical side skirt 36 which guides the piston 20 in the cylinder body 17.

Since the piston 20 is press-formed, the transverse wall 32 is formed by bending the sheet metal to a form which is complementary to that of the front end 23 of the control rod 22. More precisely, the transverse wall 32 has a spherical central portion having the same radius of curvature as the end 23 of the control rod 22, which is connected to the rear axial end 54 of the skirt 36, together with a conical portion which allows there to be a slight angular displacement of the control rod 22 about its front end 23.

In an apparatus for hydraulic control of a clutch, the pressure of the fluid is liable to reach values of the order of 30 to 40 bars, and it is therefore necessary to ensure, firstly, excellent guiding of the piston 20 in the cylinder body 17, so as to avoid any risk of interference or jamming, and secondly, to ensure high quality sealing which is capable of resisting such pressures.

With a view to improving the guiding of the piston 20, the value of the axial length of the annular skirt 36 is in the range between three and four times the value of its diameter, and to this end it includes a front tubular portion 38 and a rear tubular portion 40 on either side of the transverse wall 32 of the piston 20.

The front tubular portion 38 of the skirt 36 is arranged to cooperate, more particularly, with an internal cylindrical surface 42 of the front portion 24 of the cylinder body 17 which delimits the hydraulic chamber 16.

The rear portion 40 of the skirt 36 of the piston 20 slides axially in the rear portion 26 of the cylinder body 17.

More precisely, the rear portion 40 is in cooperation with a rear guide tube 50 which is telescoped axially into the rear portion 26 of the main body 18, and which has an internal cylindrical surface 52, the diameter of which is substantially equal to the diameter of the cylindrical internal surface 42 of the front portion 24 of the main body 18. The tube 50 is preferably made of plastics material.

The rear tube 50 has a smooth cylindrical outer surface 110, and the rear portion 26 of the main body 18 has a corresponding cylindrical inner surface 70, so that fitting of the tube 50 in the main body 18 can be carried out by simple insertion and enables a very high degree of coaxiality to be obtained in the tube 50 with respect to the main body 18.

Given the large axial length of the corresponding cylindrical surfaces 110, 70 in the tube 50 and the main body 18, and given the precision of their adjustment permitted by the absence of screw threads, it is possible to omit any sealing member between these two surfaces, while guaranteeing a good seal, by contrast with the known prior art which makes use of a screw thread.

The rear axial end 58 of the rear tube 50 is flush with the rear axial end 60 of the main body 18, and includes an internal radial collar 62 which is made in the form of a separate fitted member, and which limits the rearward course of axial travel of the piston 20 in the cylinder body 17.

In addition, the rear axial end 58 of the tube 50 extends axially towards the rear beyond the rear end 60 of the main body 18, and includes an external radial collar portion 106 which is disposed facing the rear end 60 of the main body 18.

In accordance with the invention, the rear tube 50 is fixed in the main body 18 by local welding with indirect application of heat, which is supplied from at least one energy source of the laser type. In this case, a laser emits a directed beam, the radiation of which is in the infrared region. The rear tube 50 in this example is of material identical to that of the main body 18 which is transparent to this radiation, and particularly to infrared radiation, because the laser is placed outside the main body 18. The tube 50 includes additives such as pigments, for example a small percentage of carbon, so that it absorbs infrared radiation and undergoes local heating.

During the welding operation, the laser may be turned with respect to the component or vice versa; in this way a continuous weld seam is obtained.

Besides being simpler to carry out, such a method of fastening enables complementary sealing to be ensured between the two elements.

In one embodiment, the weld is formed in the region of the collar portion 106. The weld is made at least partly between the facing surfaces of the radial collar portion 106 of the rear tube 50 and the rear axial end 60 of the main body 18.

In another version, the weld is formed between the two complementary cylindrical surfaces of the rear tube 50 and main body 18, in a desired position and over a desired length corresponding to a continuous weld, so that the collar portion 106 can then be omitted.

This may be achieved with the aid of a mask having a window for allowing directed passage of the beam emitted by the laser, and enabling the components 18, 50, which are to be welded, to be clamped.

The front portion 38 of the annular skirt 36 of the piston 20 defines a cylindrical housing which permits the guidance of a compression spring 64 which is interposed in the hydraulic chamber 16 between the front transverse wall 28 of the main body 18 and the transverse front face 30 of the piston 20, so that it forces the piston 20 into contact with the control rod 22.

In a similar way, the tubular rear portion 40 of the annular skirt 36 defines a cylindrical housing in which the front axial end of the control rod 22 is received.

Sealing of the hydraulic chamber 16 with respect to the outside is ensured by two sealing members, namely a primary seal 66 and a secondary seal 68, which are carried by the cylinder body 17 and are in cooperation with the outer cylindrical surface 48 of the annular skirt 36 of the piston 20. The seals 66, 68 are offset axially from each other.

In this first embodiment, the primary sealing member is made in the form of a composite seal 66.

The composite seal 66 consists essentially of an annular internal sleeve 88 in a material having a low coefficient of friction such as "Teflon", and an annular outer ring 90 of elastomeric material, and it is adapted to be fitted in gripped relationship within a cylindrical seating 92 formed in the transverse wall 78 which delimits the front portion 24 and rear portion 26 of the main body 18.

The cylindrical seating 92 has a diameter which is between those of the internal cylindrical surfaces, 70, 42 respectively of the rear portion 26 and front portion 24 of the main body 18, and it is open in the rear portion 26, via a chamfer 95.

When in its fitted position, the composite seal 66 is in axial forward abutment against a front axial face 94 of the seating 92, and it is gripped radially between the cylindrical side surface 93 of the seating 92 and the outer cylindrical surface 48 of the piston 20.

The external annular ring 90 of elastomeric material, by deforming, enables the gripping force applied on the internal ring 88 to be preserved while compensating for any error in the coaxial relationship between the piston 48 and the cylinder body 17.

In this way, contact pressure is obtained between the internal sleeve 88 and the piston 48 which is homogeneous over the whole circumference of the piston 48, and excellent sealing is obtained without thereby giving rise to significant friction forces between the piston 20 and the cylinder body 17.

It is necessary, for good operation of the composite seal 66, that the inner ring 88 and the outer ring 90 should be arranged axially in the same plane, and a particular annular thrust ring 96 is provided for this purpose.

The annular thrust ring 96 is in engagement through the outer periphery 98 of its front face against the rear face 100 of the transverse wall 78, and the inner periphery of its front face has a central boss 102 which enables the composite seal 66 to be gripped against the front axial face 94 of the cylindrical seating 92.

The thrust ring 96 is itself held axially against the transverse wall 78 through the axial front end 74 of the rear guide tube 50 which is in engagement against its rear face 104. The central boss 102 of the front face of the thrust ring 96 is joined to the outer periphery 98 through a profile corresponding to the chamfer 95, which enables very good centring of the thrust ring 96 in the main body 18 to be obtained by virtue of their cooperation.

In the embodiment of the invention which is shown in the drawings, the secondary seal 68 is arranged in a cylindrical seating 76 which is formed in the internal cylindrical surface 52 of the rear tube 50, and which is open in the front end 74 of the tube 50, while the secondary seal 68 is made in the form of a lipped cup ring, and is made of elastomer.

However, the secondary seal 68 could also be made in the form of a composite seal.

In another version, it may also be arranged that the two sealing members, that is to say the primary seal 66 and secondary seal 68, are arranged in cylindrical seatings formed at the front end of the rear guide tube 50. This dynamic sealing member 68 is protected during the welding operation, because the latter is preferably carried out away from the seal 68, and therefore away from the seal 66 too. The control cylinder is therefore reliable and inexpensive.

Figure 3:
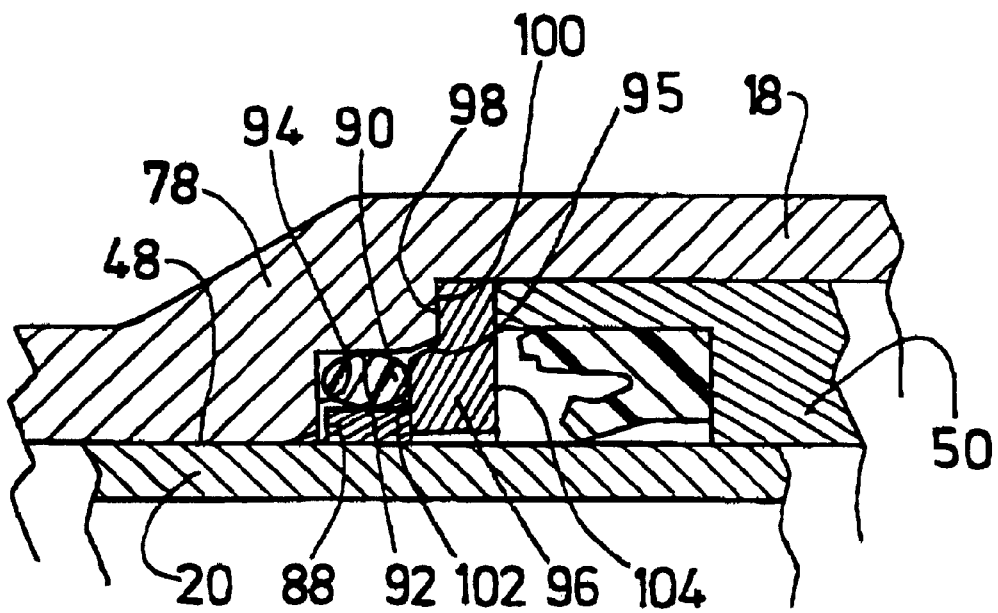
FIG. 3 shows a detail of FIG. 1 on a larger scale.

In accordance with one aspect, fitting of a receiver cylinder 10 such as that shown in FIGS. 1 to 3 is carried out in a series of axial telescoping operations which are performed successively in the same direction, which is of particular importance in connection with automatic assembly operations.

In that case, the secondary seal 68 and the piston 20 are fitted successively into the tube 50, and the special thrust ring 96 and the composite seal are then introduced around the piston 20 in engagement against the front axial end 74 of the rear tube 50.

The main body 18 is then fitted axially around these prefitted elements, without it being necessary to turn it about its axis.

When the composite seal 66 comes into contact with the chamfer 95 of its cylindrical seating 92, it is forced axially into the seating 92 by the internal peripheral boss 102 of the thrust ring 96, as far as the base of the seating 92.

The chamfer 95 in particular facilitates introduction of the seal 66 into the seating 92.

Such a design of a receiver cylinder 10 accordingly enables particularly reliable and effective sealing of the sealed chamber 16 to be obtained, while facilitating assembly of the cylinder 10.

Figure 4:
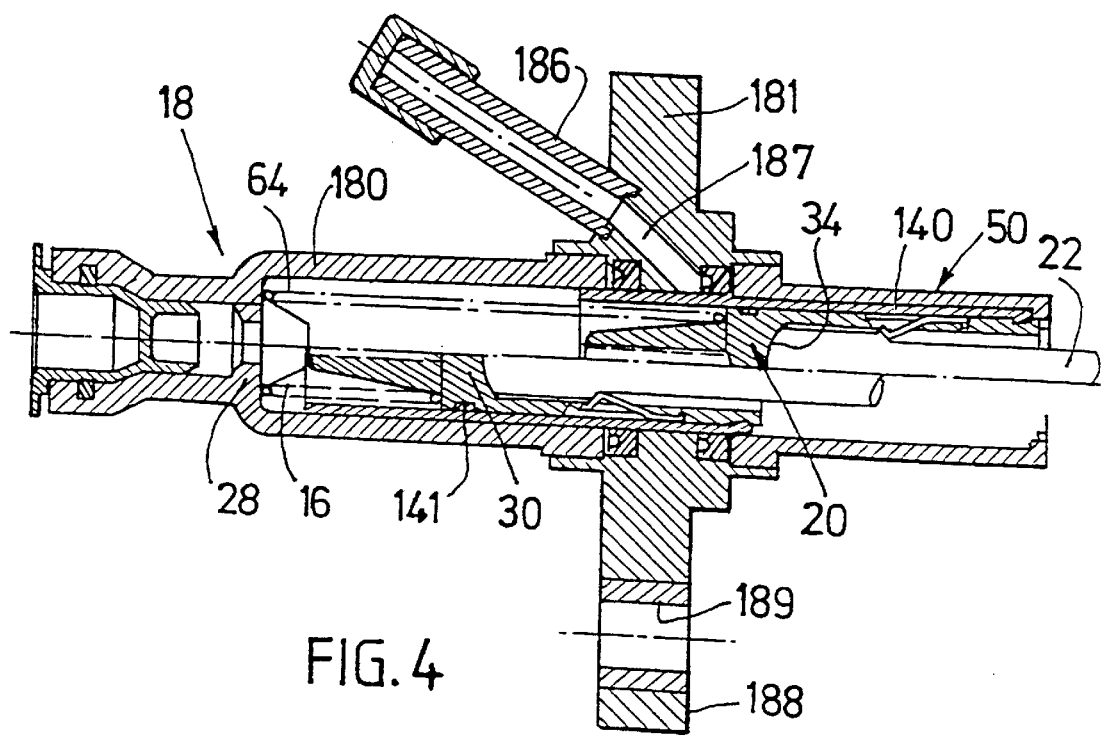
FIG. 4 is a view similar to FIG. 1 in which the piston is shown in a first or deployed position and a second or retracted position, respectively.
Figure 5:
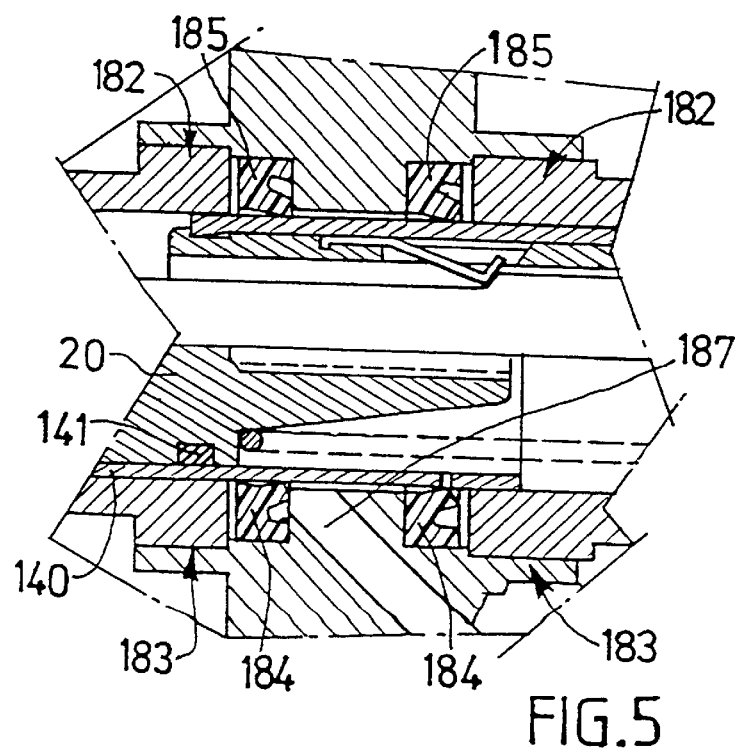
FIG. 5 is a view of the middle part of FIG. 4, on an enlarged scale.

FIGS. 4 and 5 show a modified embodiment of the invention. In these Figures, those elements which are identical to those in FIGS. 1 to 3 will be given the same references, and the main body 18 is in two parts 180, 181 which are hollow internally and of mouldable plastics material, namely a blind front piece 180 with the inlet port 14, which in this example is oriented axially, and an intermediate piece 181 which constitutes the rear part of the body 18 in which the tube 50 is mounted.

The piston 20 delimits, by its front face 30, the rear of the hydraulic chamber 16, which is also bounded by the front piece 180, given that the port 14 is open into the chamber 16. In the upper part of FIG. 4, the piston is in its deployed position, while in the lower part of that Figure it is in its retracted position.

A metal piston sleeve 140 surrounds the piston 20, being fixed axially to the piston 20, which in this example is of plastics material. For more detail, especially as regards the axial fastening of the jacket, reference should be made to application FR 98 07213 filed on Sep. 6, 1998.

The jacket 140 is guided axially by the rear tube 50 and the front piece 180, which has the same diameter, while there is a radial clearance between the jacket and the inner periphery of the piece 181. The front piece 180 and the tube 50 in this example are of identical pigmented material so as to absorb the infrared radiation emitted by the laser by which the intermediate piece 181, which is transparent to infrared radiation, is welded to the front piece 180 and the rear tube 50 respectively.

For this purpose, the piece 180 and the tube 50 have, at the rear and the front respectively, a tubular thickened portion 182, while the intermediate piece, which is in the form of a plate, has at each of its axial ends a tubular portion 183 which is force-fitted axially, in each case, on the appropriate thickened portion 182. In this case, the operation is facilitated by the use of two lasers, namely one for each welding zone 182, 183.

Rebates 104 are formed at the axial ends of the piece 181, for mounting dynamic sealing members 185 in contact with the inner periphery of the jacket 140 which is movable axially with respect to the seals 185. The jacket is formed with through holes, not shown, which are arranged to be covered by the front seal 185. An inclined through hole 187 is formed in the intermediate piece of plastics material, and is open between the two seals 185 which are carried by the piece 181 and which are immobilised axially by the thickened portions 182. The hole 187 is in communication with a duct 186 which is arranged to be connected through a pipe with a feed reservoir.

The piece 181 has ears, one of which can be seen at 188, and has a hole at 189 for fastening the emitter cylinder on a fixed part of the vehicle, for example by means of screws. The welding operation in accordance with the invention is performed locally in the region of the thickened portions 182 and portions 183, without any risk of damage to the seals 185. The piece 181 is an adapting member and enables the components 180, 50 to be standardised with a simple form, and all of this is made possible by the invention because here, the laser or lasers can be positioned at a distance from the zones 182, 183 to be welded, by contrast with the sonotrodes used in ultrasonic welding. The welding operation can be carried out using two lasers so as to make the two welds together. In another version, this welding operation may be carried out in two consecutive steps using a single laser.

The invention has been described above for a receiver cylinder, but it is easy to transpose the features of the invention in order to make an emitter cylinder of similar structure.

As will have been understood, in the case of application to a motor vehicle clutch, when the piston 20 is in its deployed position the clutch is engaged, and the diaphragm, such as is usually incorporated in the clutch, exerts a thrust via the declutching force on the control rod 22, the spring 64 then being compressed. The hydraulic chamber 16 is then depressurised. The spring 64 then exerts a pre-loading force which holds the clutch release bearing in constant contact with the diaphragm.

Pressurisation of the chamber 16 displaces the piston and therefore the rod 22, the declutching fork and the clutch release bearing. When the piston 20 occupies the retracted position, the clutch is then disengaged.

It is of advantage if the tube 50 be made of plastics material so that it expands in the same way as the main body 18. In addition, the rear tube 50 and the main body 18 serve for guiding the piston.

In this case, the main body and the rear tube are preferably of synthetic material, and in this example of plastics material having a low coefficient of friction. It will be appreciated that, where the piston is press-formed, the axial size is reduced because the control rod penetrates into at least the endmost turn of the spring 64.

In all cases, the rear tube 50 is engaged in the manner of a plug within the main body 18.

It is of course possible to provide an O-ring seal between the inner periphery of the main body 18 and the outer periphery of the rear tube, the said seal being fitted for example in a groove in the main body.

Any leakage is thus prevented at this level, so that the welded joint can made discontinuous.

In all the embodiments described, radial gripping is effected between the components so that the surfaces of the components to be welded are under prestress which is favourable to welding, and this gripping action may for example be obtained by force-fitting the components together. In another version, one of the components can be divided into lugs which are pressed radially against the other components. In that case, it is of advantage to provide an additional O-ring seal as explained above.

It is of course possible to arrange guide fingers of low friction material on the piston.

In the examples described above, the laser beam is preferably incident generally at right angles to the surfaces to be welded. The laser beam can of course be inclined with respect to the surfaces, so that there is greater freedom of design for the components to be welded together, in particular in connection with ultrasonic welding.

Figure 6:
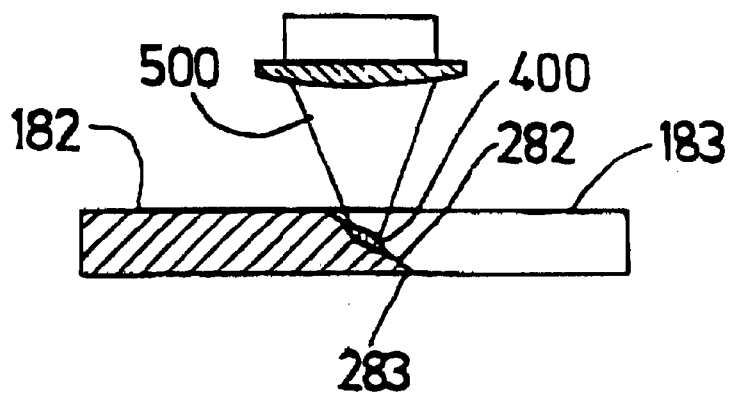
FIG. 6 is a scrap view illustrating a third version of a welding operation.

In another version, if the plane of assembly of the components to be welded is inclined, axial gripping will then be obtained between the two components in order to favour the welding operation. Thus, in FIG. 6 the thickened portion 182 is shown diagrammatically with a free end 282 which is inclined, and the tubular portion is shown at 183 with a free end 283, the two surfaces of the ends 282 and 283 being clamped against each other so as to facilitate the welding operation, which is performed locally between these surfaces at 400. The laser beam, at right angles to the thickened portion 182 and the tubular portion 183, which are extensions of each other, is shown at 500. In another version, the structures are reversed so that the two surfaces are at right angles and the laser is inclined.

Thus the tube 50 and the main body 18 are in frontal cooperation, with axial gripping by the complementary surfaces or faces 282, 283. All combinations are possible, so that in FIG. 1, the collar portion 106 and the main body 18 may have complementary welding surfaces which are not necessarily transverse.

The welding operation can also be carried out internally, with the beam first passing through the rear tube which is then formed in plastics material transparent to infrared radiation.

In all cases, one of the elements consisting of the rear tube 50 and the main body 18 is of material transparent to infrared radiation, while the other element is so configured as to absorb the said radiation. This configuration is obtained for example with the aid of at least one additive such as carbon, for example in an amount of 1 to 2%.

What is claimed is:

1. Apparatus for the hydraulic control of one of a brake and a clutch in a motor vehicle, comprising at least one control cylinder (10), wherein the cylinder (10) comprises a substantially tubular cylinder body (17) in which there slides axially a piston (20) which delimits, through a front transverse face (30), a cylindrical hydraulic chamber (16), of the type in which a port (14) for connection of a duct (12) is open into the hydraulic chamber (16), in which the cylinder body (17) is made in at least two parts of synthetic material, which parts comprise a main body (18) and a rear guide tube (50) which is fixed by welding to a rear part (26, 181) of the main body (18), and which participates in the guiding of the piston (20) in the cylinder (10), and in which at least one dynamic sealing member is interposed between the piston (20) and the rear tube (50) so as to seal the hydraulic chamber (16), wherein the welding of the rear tube (50) to the main body (18) is carried out locally by indirect application of heat with the aid of at least one laser energy source while the rear tube (50) and the main body (18) are prestressed.

2. Apparatus according to claim 1, wherein the radiation, in the form of a beam emitted by the laser, is in the infrared radiation range.

3. Apparatus according to claim 1, wherein welding of the rear tube (50) to the main body (18) is continuous and gives a sealed joint.

4. Apparatus according to claim 1, wherein welding of the rear tube (50) to the main body (18) is discontinuous, and in that additional sealing means are interposed between the rear tube (50) and the main body (18).

5. Apparatus according to claim 1, wherein the rear tube (50) is in gripping cooperation with the main body (18).

6. Apparatus according to claim 5, wherein the rear tube (50) and the main body (18) are in cooperation through complementary cylindrical surfaces (70, 110), which are telescoped with radial gripping one within the other.

7. Apparatus according to claim 5, wherein the rear tube (50) and the main body (18) are in frontal cooperation by axial abutment of complementary surfaces (282, 283).

8. Apparatus according to claim 5, wherein the welding operation is carried out at least partly between the mutually facing surfaces of a radial collar portion (106) of the rear tube (50) and the axial rear end (60) of the main body (18).

9. Apparatus according to claim 8, wherein the welding operation is carried out at least partly between two complementary cylindrical surfaces (70, 110) of the rear tube (50) and the main body (18).

10. Apparatus according to claim 9, wherein the main body (18) consists of two pieces attached to each other, namely a front piece (180) delimiting the hydraulic chamber (16) and the central piece (181) constituting the rear portion of the main body (18) in which the rear guide tube (50) is fixed by welding.

11. Apparatus for the hydraulic control of one of a brake and a clutch in a motor vehicle, comprising at least one control cylinder (10), wherein the cylinder (10) comprises a substantially tubular cylinder body (17) in which there slides axially a piston (20) which delimits, through a front transverse face (30), a cylindrical hydraulic chamber (16), of the type in which a port (14) for connection of a duct (12) is open into the hydraulic chamber (16), in which the cylinder body (17) is made in at least two parts of synthetic material such as plastics material, which parts comprise a main body (18) and a rear guide tube (50) which is fixed by welding to a rear part (26, 181) of the main body (18), and which participates in the guiding of the piston (20) in the cylinder (10), and in which at least one dynamic sealing member is interposed between the piston (20) and the rear tube (50) so as to seal the hydraulic chamber (16), wherein the welding of the rear tube (50) to the main body (18) is carried out locally by indirect application of heat with the aid of at least one energy source of the laser type, wherein the radiation, in the form of a beam emitted by the laser, is in the infrared radiation range, and wherein one of the elements consisting of the rear tube (50) and the main body (18) is of material transparent to infrared radiation, while the other element is so configured as to absorb the said radiation.

12. Apparatus according to claim 11, wherein said other element is of material transparent to said radiation and contains at least one additive for absorbing the said radiation.

13. Apparatus according to claim 12, wherein said other element is of material absorbent to said radiation.

* * * * *